United States Patent Office 2,695,903
Patented Nov. 30, 1954

2,695,903

METHOD OF PREPARING 2-METHYLISO-NICOTINIC ACID

Julius Diamond, Philadelphia, and William F. Bruce, Havertown, Pa., assignors, by mesne assignments, to American Home Products Corporation, New York, N. Y., a corporation of Delaware No Drawing. Application April 24, 1952,
Serial No. 284,206

1 Claim. (Cl. 260—295)

This invention relates to an improved method of preparing 2-methylisonicotinic acid by decarboxylating 6-methylpyridine-2,4-dicarboxylic acid.

2-methylisonicotinic acid has previously been prepared by heating 6-methylpyridine-2,4-dicarboxylic acid to its melting point (M. P. 274° C.) under atmospheric pressure. The yield was small (Bottinger Ber. deut. chem. Ges., 14, 67; 17, 92). We have discovered that the 2-methylisonicotinic acid may be prepared in excellent yield by heating 6-methylpyridine-2,4-dicarboxylic acid under reduced pressure at a temperature in the neighborhood of 200° C., removing the carbon dioxide liberated at such a rate as to maintain the pressure below 5 mm. of mercury, and continuing the heating until substantially 1 mol of carbon dioxide has been eliminated from the starting product. Under these conditions the 2-methylisonicotinic acid sublimes from the reaction mixture and is collected as a sublimate, thus combining an initial purification step with the synthesis.

Example 12 g. of 6-methylpyridine-2,4-dicarboxylic acid were heated in a closed reaction vessel at 180°–210° C. for 2–3 hours, the carbon dioxide evolved being removed by a vacuum pump at such a rate as to maintain the pressure over the reaction mixture at approximately 3 mm. of mercury, provision being made for condensing and collecting the sublimate. The sublimate of 2-methylisonicotinic acid was collected and amounted to 8.5 g., a yield of 93.4 percent of the theory. It was further purified by recrystallization from water yielding a product melting at 294°–295° C. (uncor.).

Instead of carrying out the decarboxylation under reduced pressure, the partial pressures of the reaction products, 2-methylisonicotinic acid and carbon dioxide, may be kept at a low level in the reaction zone and these products removed by passing a current of inert gas or vapor through the reaction zone.

We claim:

The improved process of producing 2-methylisonicotinic acid which comprises heating 6-methylpyridine-2,4-dicarboxylic acid at a temperature in the neighborhood of 200° C. in a closed reaction zone while exhausting evolved carbon dioxide from the reaction zone at such a rate as to maintain the pressure over the reaction mixture at not over 5 mm. of mercury, continuing the heating for 2–3 hours, whereby substantially 1 mol of carbon dioxide is eliminated from the starting product, and collecting as a sublimate 2-methylisonicotinic acid.

References Cited in the file of this patent

UNITED STATES PATENTS

| Number | Name | Date |
|---|---|---|
| 2,389,065 | Lee et al. | Nov. 13, 1945 |

OTHER REFERENCES

Bottinger, "Ber. Deut. Chem. Ges.," vol. 14, pp. 67–70.
Bottinger, "Ber. Deut. Chem. Ges.," vol. 17, pp. 92–95.
Elderfield, "Heterocyclic Compounds" (1950), vol. 1, pp. 568–71.